US011112943B1

United States Patent
Alameh et al.

(10) Patent No.: US 11,112,943 B1
(45) Date of Patent: Sep. 7, 2021

(54) ELECTRONIC DEVICES AND CORRESPONDING METHODS FOR USING EPISODIC DATA IN MEDIA CONTENT TRANSMISSION PRECLUSION OVERRIDES

(71) Applicant: Motorola Mobility LLC, Chicago, IL (US)

(72) Inventors: Rachid Alameh, Crystal Lake, IL (US); Alvin Von Ruff, Woodstock, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/882,454

(22) Filed: May 23, 2020

(51) Int. Cl.
| | |
|---|---|
| *H04L 29/06* | (2006.01) |
| *G06F 3/0482* | (2013.01) |
| *G06F 3/0481* | (2013.01) |
| *G06F 3/0488* | (2013.01) |
| *G06F 3/0484* | (2013.01) |

(52) U.S. Cl.
CPC .......... *G06F 3/0482* (2013.01); *G06F 3/0484* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2014/0281004 A1* | 9/2014 | Bridges | H04N 21/4622 709/231 |
| 2016/0112750 A1* | 4/2016 | Hager, IV | H04N 21/4725 725/34 |
| 2018/0210939 A1 | 7/2018 | Cho et al. | |
| 2019/0354235 A1 | 11/2019 | Alameh et al. | |

FOREIGN PATENT DOCUMENTS

WO     2016126162     8/2015

OTHER PUBLICATIONS

Ahren, et al., "ZoneTag: Designing Context-Aware Mobile Media Capture to Increase Participation", Proceeding of Workshop on Pervasive Image Capture and Sharing; 2006; https://pdfs.semanticscholar.org/fb0b/9e351ea593a4f574d5996a7ec8954f6471da.pdf.
Sarvas, et al., "Metadata Creation System for Mobile Images", MobiSys 2004; Proceedings of the 2nd international conference on Mobile systems, applications, and services;Jun. 2004; pp. 36-48; https://doi.org/10.1145/990064.990072.

* cited by examiner

*Primary Examiner* — Carl Adams
(74) *Attorney, Agent, or Firm* — Philip H. Burrus, IV

(57) ABSTRACT

An electronic device included a user interface receiving user input requesting transmission of media content to another electronic device. One or more processors of the electronic device, operable with the user interface, present episodic data at the user interface in response to the user input and preclude transmission of the media content to the another electronic device while presenting the episodic data summary at the user interface. The one or more processors transmit the media content after additional authorization confirming that the episodic data has been reviewed is received at the user interface.

20 Claims, 8 Drawing Sheets

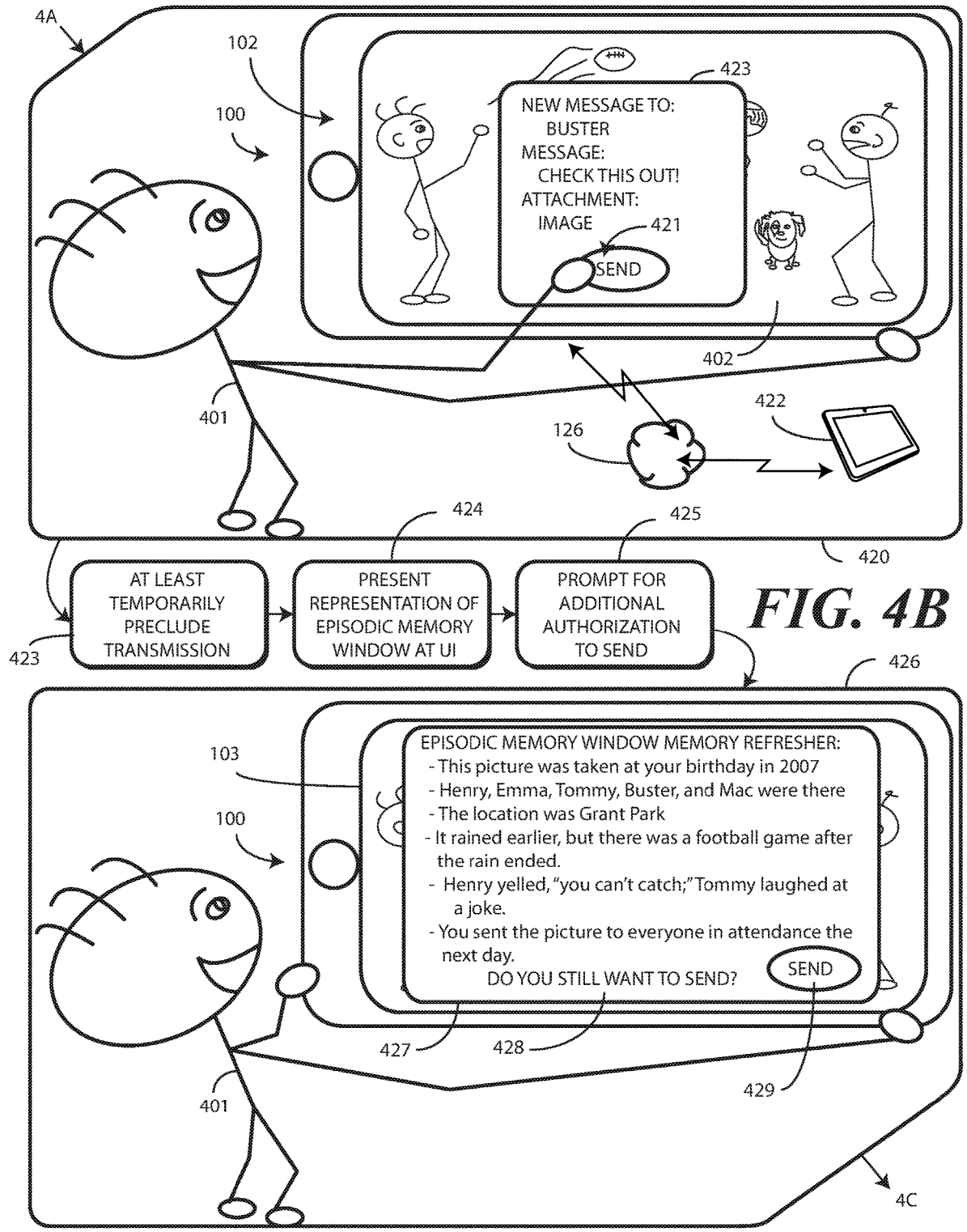

ately precluding, by one or more processors of the electronic device, transmission of the media content in response to the user input and presenting, by the one or more processors in response to user input received at the user interface requesting transmission of the media content to another electronic device, episodic data detected by one or more sensors of the electronic device during capture of the media content. Alternatively, some or all functions could be implemented by a state machine that has no stored program instructions, or in
ELECTRONIC DEVICES AND CORRESPONDING METHODS FOR USING EPISODIC DATA IN MEDIA CONTENT TRANSMISSION PRECLUSION OVERRIDES

BACKGROUND

Technical Field

This disclosure relates generally to electronic devices, and more particularly to electronic devices with communication devices configured to transmit media content.

Background Art

People employ electronic devices, such as smartphones, tablet computers, laptop computers, and so forth, to share media content such as images, sounds, video, files, or other data. Once media content is transmitted to another electronic device, retrieving, deleting, or otherwise controlling the transmitted media content can be difficult or impossible. It would be advantageous to have improved electronic devices and methods that helping to ensure that media content is transmitted only when intended.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 4B illustrates one or more explanatory method steps in accordance with one or more embodiments of the disclosure.

Figure 1:
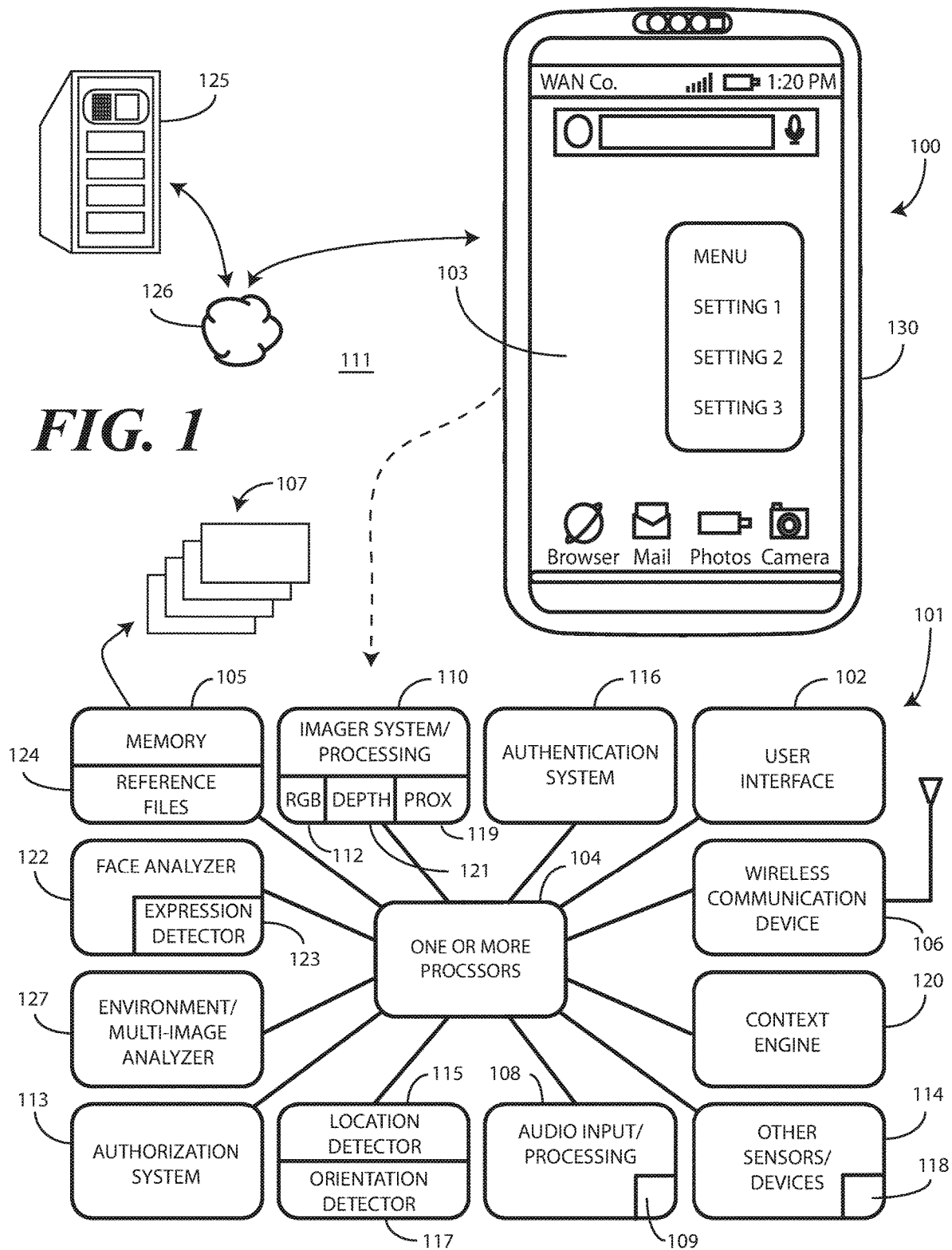
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting episodic data extracted from an episodic memory window at a user interface of an electronic device in response to receiving user input requesting transmission of the media content to another electronic device while one or more processors of the electronic device at least temporarily preclude transmission of the media content in response to the user input. This allows an authorized user of the electronic device to recall details of the media content to ensure that transmission of the media content to the other electronic device is actually desired. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of extracting an episodic data summary attached to media content and presenting the episodic data at the user interface in response to user input requesting transmission of the media content to another electronic device, as well as precluding transmission of the media content to the other electronic device while presenting the episodic data summary at the user interface as described herein. The non-processor circuits may include, but are not limited to, a radio receiver, a radio transmitter, signal drivers, clock circuits, power source circuits, and user input devices.

As such, these functions may be interpreted as steps of a method to perform one or more of at least temporarily precluding, by one or more processors of the electronic device, transmission of the media content in response to the user input and presenting, by the one or more processors in response to user input received at the user interface requesting transmission of the media content to another electronic device, episodic data detected by one or more sensors of the electronic device during capture of the media content. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure adapt episodic memory running continuously in the background of an operating system of an electronic device to tag media content, such as media content captured by one or more sensors of the electronic device, at the time of capture to create a contextual summary associated with the media content. This episodic data can be stored with the media content. In one or more embodiments, when a user interface of the electronic device receives user input requesting transmission of the media content to another electronic device, one or more processors of the electronic device present the episodic data at the user interface to override a sharing restriction.

Illustrating by example, in one or more embodiments a user interface of an electronic device receives user input requesting transmission of media content from a memory of the electronic device to another electronic device. In one or more embodiments, one or more processors of the electronic device at least temporarily preclude the transmission of the media content to the other electronic device in response to the user input. In one or more embodiments, the one or more processors then present, at the user interface in response to the user input received at the user interface, episodic data detected by one or more sensors of the electronic device when the media content was captured and attached as metadata in the form of an episodic memory window.

The presentation of this episodic memory window, which provides an episodic data summary to the authorized user of the electronic device alerting them to episodic details associated with the media content, allows the authorized user to ensure that they do indeed intend to transmit the media content to the other electronic device. In one or more embodiments, provided that the authorized user does indeed intend to transmit the media content, they may deliver additional authorization to transmit the media content to the other electronic device at the user interface while the one or more processors at least temporarily preclude the transmission of the media content. The one or more processors, in response to receiving this additional authorization, can then cease the at least temporarily precluding of the transmission and cause a communication device to transmit the media content to the other electronic device.

In one or more embodiments, the episodic memory window provides a summary of the media content that allows an authorized user of an electronic device to quickly assess the content of the media content prior to overriding the at least temporary preclusion of the transmission of the media content. In one or more embodiments, a memory architecture configured as a memory component operable with an artificial intelligence engine includes three memory sectors: a future memory sector, a present memory sector, and a past memory sector. Each memory sector can be configured solely in the electronic device, solely in a remote electronic device such as a cloud server, or as a combined memory architecture operable both in the electronic device and in a remote electronic device such as a cloud server.

In one or more embodiments, the future memory sector comprises an imagination memory that, when operable with the artificial intelligence engine, stores data relating to tasks that may help the user. For instance, the imagination memory may store predictive data relating to operations and procedures a user may execute or perform in the future, e.g., a website suggestion, a future calendar event suggestion, media content exploration suggestions, and so forth. In one or more embodiments the imagination memory is situated within the electronic device. In one or more embodiments, this is true even when the future memory sector is configured as a combined memory architecture operable both in the electronic device and in a remote electronic device such as a cloud server.

In one or more embodiments, the present memory sector includes one or more of a working memory, a procedural memory, and an initiative memory. These components, collectively referred to as the more general procedural memory, store data relating to how to execute operations within the electronic device. The procedural memory therefore stores data associated with task-oriented operations. Examples of such operations include performing control operations in the electronic device, running applications on an application layer of the operating system, and so forth. In one or more embodiments, the procedural memory is situated within the electronic device. In one or more embodiments, this is true even when the procedural memory is configured as a combined memory architecture operable both in the electronic device and in a remote electronic device such as a cloud server.

In one or more embodiments, the past memory sector includes a plurality of memories. Illustrating by example, in one or more embodiments the past memory sector includes a sematic memory and an episodic memory. The semantic memory, generally situated at a remote electronic device such as a cloud server to take advantage of increased processing power, stores generalizations and abstractions on data received from one or both of the episodic memory or external sources. The semantic memory then can deliver these generalizations and abstractions to the procedural memory, the imagination memory, or other components.

In one or more embodiments, the artificial intelligence engine stores episodic data summaries in the form of episodic memory windows in the episodic memory. These episodic memory windows can store indications of user behaviors, user interests, user preferences, past jobs performed for the user, and other information. For example, in one or more embodiments each episodic memory window provides a good summary pertaining to media content being captured by one or more sensors of the electronic device.

In one or more embodiments this artificial intelligence-driven episodic memory runs continually in the background when the electronic device is being used. When one or more sensors of the electronic device capture media content, e.g., an image, a sound, a video, or combinations thereof, one or more processors of the electronic device can select an episodic memory window from the episodic memory to be attached to the media content as metadata. In one or more embodiments the episodic memory window includes data abstracted by the artificial intelligence engine, optionally using the semantic memory, pertaining to the time just before, during, and just after the media content is captured. Episodic memory windows configured in accordance with embodiments of the disclosure can include contextual data such as the time when the media content was captured, the location where the media content was captured, key words spoken when the media content was captured, voices audibly occurring when the media content was captured, imagery occurring when the media content was captured, environmental data occurring when the media content was captured, contextual data occurring when the media content was captured, and other devices, proximities, and engagements.

Illustrating by example, consider the situation when an authorized user of an electronic device uses one or more sensors of the electronic device to capture a short video clip at the beach with family memories. In one or more embodiments, the episodic data being captured and stored in the episodic memory by the artificial intelligence engine during the capture of the media content (and perhaps shortly prior to capturing the media content and shortly after capturing the media content) is automatically attached or tagged or saved to the media content as an episodic memory window. In one or more embodiments, the episodic memory window includes episodic data relating to people present during the media content capture, voices occurring during the media content capture, keywords spoken during the media content capture, the location of the electronic device when the media content was captured, the time at which the media content was captured, imagery or scenic snapshots of the environment where the media content is captured, what other electronic devices are nearby when the media content was captured, and so forth.

In one or more embodiments, when the authorized user of the electronic device attempts to share the video clip by delivering user input to a user interface of the electronic device, one or more processors of the electronic device at least temporarily preclude any transmission of the media content by the communication device of the electronic device. Instead, in one or more embodiments the media-sharing action causes one or more processors of the electronic device to present episodic data from the episodic memory window on the user interface of the electronic device for review by the authorized user of the electronic device. Said differently, this media-sharing action triggers presentation from the episodic memory the captured episodic memory window relating to the media content attempting to be shared. The authorized user then sees the episodic data summary, for example, on the display of the electronic device. The episodic data summary summarizes key content for quick review. If the authorized user does indeed want to transmit the media content after reviewing the episodic data summary, they may deliver additional authorization to the user interface of the electronic device to override the temporary preclusion of transmission. Upon receiving the additional authorization, the one or more processors of the electronic device can cease the at least temporary preclusion of transmission and can instead cause a communication device of the electronic device to transmit the media content in accordance with the original user input received at the user interface requesting the same.

Turning now to FIG. 1, illustrated therein is one explanatory electronic device 100 configured in accordance with one or more embodiments of the disclosure. Also illustrated in FIG. 1 is block diagram schematic 101 for the electronic device 100. It should be noted that the electronic device 100, while shown as a smartphone for illustrative purposes in FIG. 1, can be any of a number of various types of devices. It will be obvious to those of ordinary skill in the art having the benefit of this disclosure that the block diagram schematic 101 of FIG. 1 could be adapted for use with other devices as well, including conventional desktop computers, palm-top computers, tablet computers, gaming devices, media players, wearable devices, or other devices.

In one or more embodiments, the components of the block diagram schematic 101 are configured as a printed circuit board assembly disposed within a housing 130 of the electronic device 100. Various components can be electrically coupled together by conductors or a bus disposed along one or more printed circuit boards.

The illustrative block diagram schematic 101 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 101 includes a user interface 102. In one or more embodiments, the user interface 102 includes a display 103. Where included, the display 103 may optionally be touch-sensitive.

In one or more embodiments, users can deliver user input to the display 103 of such an embodiment by delivering touch input from a finger, stylus, or other objects disposed proximately with the display 103. In one embodiment, the display 103 is configured as an active matrix organic light emitting diode (AMOLED) display. However, it should be noted that other types of displays, including liquid crystal displays, suitable for use with the user interface 102 would be obvious to those of ordinary skill in the art having the benefit of this disclosure.

In one embodiment, the electronic device includes one or more processors 104. The one or more processors 104 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 101. Each of the application processor and the auxiliary processor(s) can be configured to process and execute executable software code to perform the various functions of the electronic device with which the block diagram schematic 101 operates. A storage device, such as memory 105, can optionally store the executable software code used by the one or more processors 104 during operation. One or more embodiments of the memory 105 will be described in more detail below with reference to FIGS. 2-3.

In this illustrative embodiment, the block diagram schematic 101 also includes a communication device 106 that can be configured for wired or wireless communication with one or more other devices or networks. The networks can include a wide area network, a local area network, and/or personal area network. The communication device 106 may also utilize wireless technology for communication, such as, but are not limited to, peer-to-peer or ad hoc communications such as HomeRF, Bluetooth, and IEEE 802.11, as well as other forms of wireless communication such as infrared technology. The communication device 106 can include wireless communication circuitry, one of a receiver, a transmitter, or transceiver, and one or more antennas.

In one embodiment, the one or more processors 104 can be responsible for performing the primary functions of the electronic device with which the block diagram schematic 101 is operational. For example, in one embodiment the one or more processors 104 comprise one or more circuits operable with the user interface 102 to present presentation information to a user. The executable software code used by the one or more processors 104 can be configured as one or more modules 107 that are operable with the one or more processors 104. Such modules 107 can store instructions, control algorithms, and so forth.

In one or more embodiments, the block diagram schematic 101 includes an audio input/processor 108. The audio input/processor 108 can include hardware, executable code, and speech monitor executable code in one embodiment. The audio input/processor 108 can include, stored in memory 105, basic speech models, trained speech models, or other modules that are used by the audio input/processor 108 to receive and identify voice commands that are received with audio input 109 captured by an audio capture device. In one embodiment, the audio input/processor 108 can include a voice recognition engine. Regardless of the specific implementation utilized in the various embodiments, the audio input/processor 108 can access various speech models to identify speech commands.

In one embodiment, the audio input/processor 108 is configured to implement a voice control feature that allows a user to speak a specific device command to cause the one or more processors 104 to execute a control operation. For example, the audio input/processor 108 may deliver a device command requesting the one or more processors 104 to capture media content, such as an image or video, using the imager processor system 110 from an environment 111 about the electronic device 100. Consequently, this device command can cause the one or more processors 104 to access the imager processors system 110, an imager 112, and/or audio input 109 to capture media content from the environment 111.

As will be explained in more detail below, in one or more embodiments when user input is received at the user interface 102 requesting that captured or stored media content be transmitted to another remote electronic device, the one or more processors 104 initially preclude—at least temporarily—the transmission of the media content to the other electronic device in response to the user input. In one or more embodiments, this allows the one or more processors to present episodic data on the user interface 102 for consideration by the user of the electronic device 100 to ensure that the user does indeed intend to transmit the media content.

As will also be explained in more detail below, upon considering the episodic data presented on the user interface 102, the user can deliver additional authorization to the user interface 102 to override the temporary preclusion of transmission of the media content. In one or more embodiments, an authentication system 113 and its authentication process can also be used to obtain additional authorization to transmit such media content.

For example, when the one or more processors 104 optionally prompt for additional authorization to transmit media content to another electronic device, in one or more embodiments the one or more processors 104 can cooperate with the authentication system 113 to obtain that additional authorization by obtaining authentication information from the authorized user as proxy additional authorization information. In one or more embodiments, the additional authorization requested can comprise a personal identification number (PIN). Where requested, the user is required to manually enter the additional authorization in response to the prompt. While this works well, in other embodiments rather than requiring the authorized user to enter the additional authorization manually, the authentication systems of the electronic device 100 can passively obtain the additional authorization to transmit media content as well.

Consequently, in one or more embodiments the authentication system 113 can be configured to passively obtain the additional authorization from the user by re-authenticating the user as an authorized user of the electronic device 100 in response to the prompt. When the authentication information used as additional authorization to transmit media content to another electronic device is received in the form of audio input, in one embodiment the audio input/processor 108 listens for voice commands, processes the commands and, in conjunction with the one or more processors 104, performs an authentication procedure in response to voice input to, if successful, ceases the at least temporarily precluding of the transmission and instead cause the communication device 106 to transmit the media content to the other electronic device. Other examples of additional authorization will be described below. Still others will be obvious to those of ordinary skill in the art having the benefit of this disclosure.

Various sensors 114 can be operable with the one or more processors 104. FIG. 1 illustrates several examples such sensors 114. It should be noted that those shown in FIG. 1 are not comprehensive, as others will be obvious to those of ordinary skill in the art having the benefit of this disclosure. Additionally, it should be noted that the various sensors 114 shown in FIG. 1 could be used alone or in combination. Accordingly, many electronic devices will employ only subsets of the sensors 114 shown in FIG. 1, with the particular subset defined by device application.

A first example of a sensor 114 that can be included with the other components is a touch sensor. The touch sensor can include a capacitive touch sensor, an infrared touch sensor, resistive touch sensors, or another touch-sensitive technology. Other types of touch sensors will be obvious to those of ordinary skill in the art having the benefit of this disclosure.

Another example of a sensor 114 is a geo-locator that serves as a location detector 115. In one embodiment, location detector 115 is able to determine location data when the electronic device 100 captures media content, when the electronic device 100 receives user input at the user interface 102 requesting transmission of the media content, or location data when other operations occur with the electronic device 100. As will be described in more detail below, in one or more embodiments an artificial intelligence (AI) engine 116 can extract episodic location data from the data captured by the location detector 115 for storage in an episodic memory window of the episodic memory of the memory 105.

Location data can be captured in a variety of ways, including by capturing the location data from a constellation of one or more earth orbiting satellites, or from a network of terrestrial base stations to determine an approximate location. In one or more embodiments, The satellite positioning systems based location fixes of the location detector 115 autonomously or with assistance from terrestrial base stations, for example those associated with a cellular communication network or other ground based network, or as part of a Differential Global Positioning System (DGPS), as is well known by those having ordinary skill in the art. The location detector 115 may also be able to determine location by locating or triangulating terrestrial base stations of a traditional cellular network, or from other local area networks, such as Wi-Fi networks.

One or more motion detectors can be configured as an orientation detector 117 that determines an orientation and/or movement of the electronic device 100 in three-dimensional space. Illustrating by example, the orientation detector 117 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 117 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

The one or more sensors 114 can also include a gaze detector for detecting the user's gaze point. The gaze detector can optionally include sensors for detecting the alignment of a user's head in three-dimensional space. Electronic signals can then be processed for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detector can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector of FIG. 2.

Other components 118 operable with the one or more processors 104 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 118 can also include proximity sensors 119. The proximity sensors 119 fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 130 of the electronic device 100. In one embodiment, the signal receiver is an infrared signal receiver to receive an infrared emission from an object such as a human being when the human is proximately located with the electronic device 100.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 118 can optionally include a barometer or altimeter operable to sense changes in air pressure due to elevation changes or differing pressures of the electronic device 100. The other components 118 can also optionally include a light sensor that detects changes in optical intensity, color, light, or shadow in the environment of an electronic device. An infrared sensor can be used in conjunction with, or in place of, the light sensor. Similarly, the other components 118 can include a temperature sensor configured to monitor temperature about an electronic device 100.

A context engine 120 can then operable with the various sensors to detect, infer, capture, and otherwise determine persons and actions that are occurring in an environment about the electronic device 100. For example, where included one embodiment of the context engine 120 determines assessed contexts and frameworks using adjustable algorithms of context assessment employing information, data, and events. These assessments may be learned through repetitive data analysis. These assessments can be used to obtain additional authorization to transmit media content in one or more embodiments. Alternatively, a user may employ the user interface 102 to enter various parameters, constructs, rules, and/or paradigms that instruct or otherwise guide the context engine 120 in detecting multi-modal social cues, emotional states, moods, and other contextual information that can be used as additional authorization to transmit media content in response to a prompt by the one or more processors 104. The context engine 120 can comprise an artificial neural network or other similar technology in one or more embodiments.

In one or more embodiments, the context engine 120 is operable with the one or more processors 104. In some embodiments, the one or more processors 104 can control the context engine 120. In other embodiments, the context engine 120 can operate independently, delivering information gleaned from detecting multi-modal social cues, emotional states, moods, and other contextual information to the one or more processors 104. The context engine 120 can receive data from the various sensors. In one or more embodiments, the one or more processors 104 are configured to perform the operations of the context engine 120.

In one or more embodiments, the imager processor system 110 comprises an imager 112 that can be operable with the authentication system 113. The imager processor system 110 can also include an optional depth imager 121, which can also be operable with the authentication system 113.

In one embodiment, the imager 112 comprises a two-dimensional imager configured to receive at least one image of a person within the environment 111 of the electronic device 100. In one embodiment, the imager 112 comprises a two-dimensional RGB imager. In another embodiment, the imager 112 comprises an infrared imager. Other types of imagers suitable for use as the imager 112 of the authentication system will be obvious to those of ordinary skill in the art having the benefit of this disclosure.

The depth imager 121, where included, can take a variety of forms. For example, the depth imager 121 can comprise a pair of imagers separated by a predetermined distance, such as three to four images. This "stereo" imager works in the same way the human eyes do in that it captures images from two different angles and reconciles the two to determine distance.

Alternatively, the depth imager 121 can comprise a structured light laser that projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 121 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained.

Regardless of embodiment, where included the depth imager 121 adds detection of a third "z-dimension" to the x-dimension and y-dimension captured by the imager 112. This additional dimension can be used to enhance the security of using a person's face as authentication data, be it for use as their password in the process of authentication by facial recognition or for use as additional authorization to transmit media content when the one or more processors 104 prompt the person for the same.

In one or more embodiments, the authentication system 113 can be operable with a face analyzer 122 and/or an environmental analyzer 127. The face analyzer 122 and/or environmental analyzer 127 can be configured to process an image or depth scan of an object and determine whether the object matches predetermined criteria. For example, the face analyzer 122 and/or environmental analyzer 127 can operate as an identification module configured with optical and/or spatial recognition to identify objects using image recognition, character recognition, visual recognition, facial recognition, color recognition, shape recognition, and the like.

Advantageously, the face analyzer 122 and/or environmental analyzer 127, operating in tandem with the authentication system 113, can be used as a facial recognition device to determine the identity of one or more persons detected about the electronic device 100. In one or more embodiments, this identity can be used as additional authorization to transmit media content in response to prompts by the one or more processors 104 when episodic data is being presented on the user interface 102 to refresh the memory of the user with an episodic data summary relating to the media content in question.

In one or more embodiments, when the authentication system 113 detects a person, one or both of the imager 112 and/or the depth imager 121 can capture a photograph and/or depth scan of that person. The authentication system 113 can then compare the image and/or depth scan to one or more predefined authentication reference files 124 stored in the memory 105. This comparison, in one or more embodiments, is used to confirm beyond a threshold authenticity probability that the person's face—both in the image and the depth scan—sufficiently matches one or more of the reference files 124.

Beneficially, this optical recognition performed by the authentication system 113 operating in conjunction with the face analyzer 122 and/or environmental analyzer 127 allows access to the electronic device 100—or alternatively transmission of media content after a review of episodic data being presented at the user interface 102 of the electronic device 100—only when one of the persons detected about the electronic device are sufficiently identified as the owner and/or authorized user of the electronic device 100.

In one or more embodiments, an AI engine 116 is operable with the various sensors 114 of the electronic device 100. In one or more embodiments, the AI engine 116 includes its own processing engine. The AI engine 116 can extract episodic data from data received from the various sensors 114 for storage in a plurality of episodic memory windows of an episodic memory of the memory 105 in one or more embodiments. The AI engine 116 can receive inputs and settings from the various sensors 114 capturing data from the environment 111 about the electronic device 100 in one or more embodiments. In one or more embodiments, the AI engine 116 transforms the inputs and settings into machine learned knowledge, and can additionally store episodic data summaries in the episodic memory windows of the episodic memory of the memory 105. Alternatively, the AI engine 116 can store the episodic memory windows in a remote electronic device, such as a cloud server 125 in communication with the electronic device 100 across a network 126.

In one or more embodiments, the AI engine 116 is constantly receiving data from the various sensors 114 in a background mode of operation. For example, in one or more embodiments the AI engine 116 continually receives data streams from the imager 112, the proximity sensors 119, the audio input 109, the face analyzer 122, the expression detector 123, the context engine 120, the imager processor system 110, the location detector 115, the orientation detector 117, and/or the authentication system 113. The AI engine 116 can then extract episodic data summaries from this data to store in a plurality of episodic memory windows. Each episodic memory window can include summary information relating to predefined periods of time, such as a few seconds. This summary information can include episodic data such as time, location, key spoken words, voices, imagery, environment, context, and other devices proximities and engagements. Accordingly, in one or more embodiments the AI engine 116 "smartly interacts" with the various sensors 114 to extract episodic data summaries from the vast troves of data received from the sensors.

Figure 2:
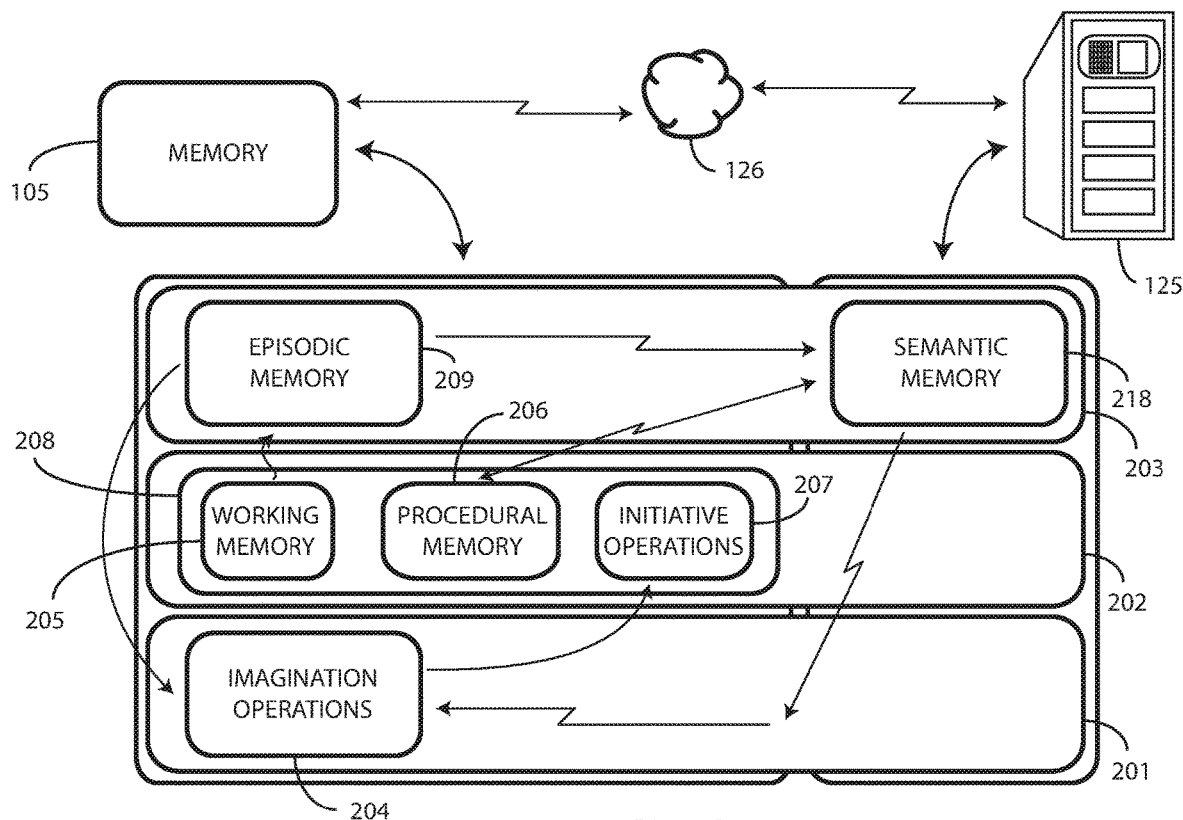
FIG. 2 illustrates one explanatory memory component in accordance with one or more embodiments of the disclosure.

To illustrate how episodic data, episodic data summaries, and episodic memory windows differ from raw tagged data, a more in-depth consideration of the memory 105 is in order. Turning now to FIG. 2, illustrated therein is an architectural diagram of one explanatory memory 105 configured in accordance with one or more embodiments of the disclosure.

In one or more embodiments, the memory architecture 200 of the memory 105 operable with the AI engine (116) of FIG. 1 includes three memory sectors: a future memory sector 201, a present memory sector 202, and a past memory sector 203. Each memory sector can be configured solely in the memory 105 of the electronic device (100), solely in a remote electronic device such as a cloud server 125 in communication with the memory 105 of the electronic device (100) across a network 126, or as a combined memory architecture operable both in the memory 105 of the electronic device (100) and in a remote electronic device such as a cloud server 125.

In one or more embodiments, the future memory sector 201 comprises an imagination operations memory 204 that, when operable with the AI engine (116), stores data relating to tasks that may help the user of the electronic device (100), but that the user of the electronic device (100) has not yet requested. For instance, the imagination operations memory 204 may store predictive data relating to operations and procedures a user may execute or perform in the future, e.g., a website suggestion, a future calendar event suggestion, media content exploration suggestions, and so forth. In one or more embodiments the imagination operations memory 204 is situated within the memory 105 of the electronic device (100). This is the illustrative embodiment shown in FIG. 2. In one or more embodiments, this is true even when the future memory sector 201 is configured as a combined memory architecture operable both in the memory 105 of the electronic device (100) and in a remote electronic device such as a cloud server 125 as shown in FIG. 2.

In one or more embodiments, the present memory sector 202 includes one or more of a working operations memory 205, a procedural operations memory 206, and an initiative operations memory 207. These components, collectively referred to as the more general procedural memory 208, store data relating to how to execute operations within the electronic device (100). The procedural memory 208 therefore stores data associated with task-oriented operations. Examples of such operations include performing control operations in the electronic device (100), running applications on an application layer of the operating system on the one or more processors (104) of the electronic device (100), and so forth. In one or more embodiments, the procedural memory 208 is situated only within the memory 105 of the electronic device (100). In one or more embodiments, this is true even when the procedural memory 208 is configured as a combined memory architecture operable both in the electronic device (100) and in a remote electronic device such as a cloud server 125.

In one or more embodiments, the past memory sector 203 includes a plurality of memories. Illustrating by example, in one or more embodiments the past memory sector 203 includes a sematic operations memory 208 and an episodic memory 209. The semantic operations memory 208, generally situated at a remote electronic device such as a cloud server 125 to take advantage of increased processing power, stores generalizations and abstractions on data received from one or both of the episodic memory 209 or external sources, such as other cloud servers or other electronic devices. The semantic memory 218 then can deliver these generalizations and abstractions to the procedural memory, the imagination memory, or other components.

In one or more embodiments, the AI engine (116) stores episodic data summaries in the form of episodic memory windows in the episodic memory 209. These episodic memory windows can store indications of user behaviors, user interests, user preferences, past jobs performed for the user, and other information. For example, in one or more embodiments each episodic memory window stored in the episodic memory 209 provides a good summary pertaining to media content being captured by one or more sensors (114) of the electronic device (100).

In one or more embodiments this episodic memory 209, driven by the AI engine (116), runs continually in the background when the electronic device (100) is being used. When one or more sensors (114) of the electronic device (100) capture media content, e.g., an image, a sound, a video, or combinations thereof, in one or more embodiments one or more processors (104) of the electronic device (100) can select an episodic memory window from the episodic memory 209 to be attached to the media content as metadata.

Figure 3:
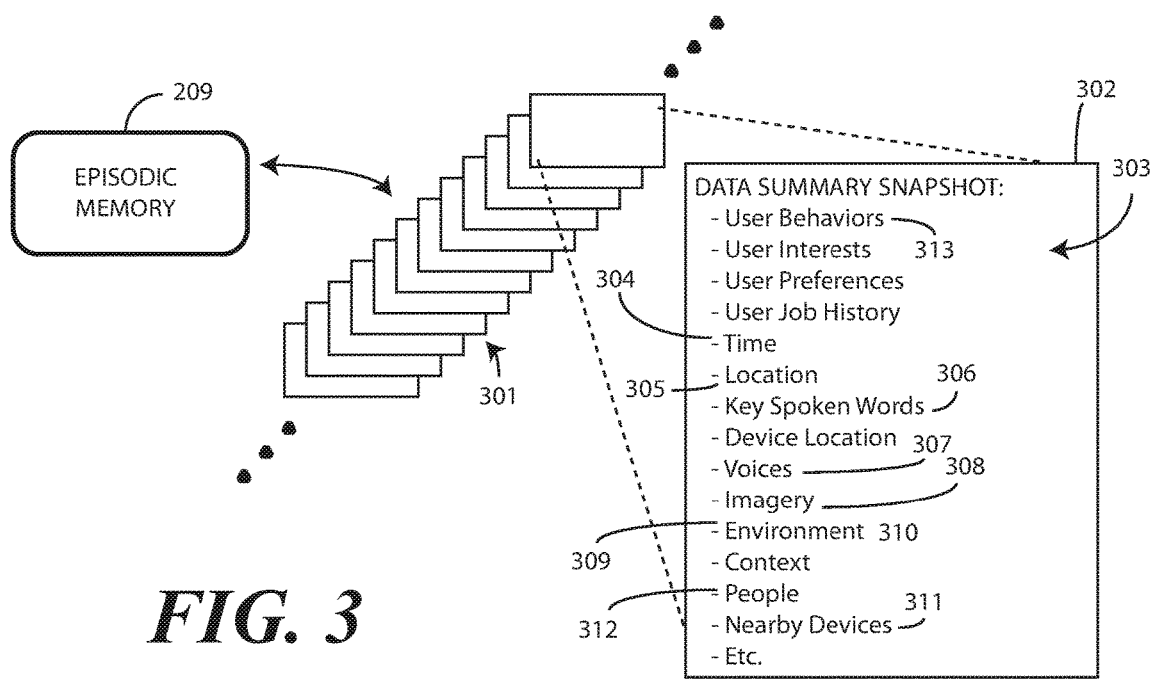
FIG. 3 illustrates one explanatory episodic memory component in accordance with one or more embodiments of the disclosure.

Turning now to FIG. 3, illustrated therein are a plurality of episodic memory windows 301 being continually stored in the episodic memory 209. In one or more embodiments, each episodic memory window 302 includes an episodic data summary 303 configured to refresh the mind of a user of the electronic device (100) when considering content, e.g., media content, to which the episodic memory window 302 is attached.

In one or more embodiments the episodic memory window 302 includes data abstracted by the AI engine (116), optionally using the semantic memory (218), pertaining to the time just before, during, and just after the one or more sensors (114) of the electronic device (100) capture media content. Episodic memory windows 301 configured in accordance with embodiments of the disclosure can include contextual data such as the time 304 when the media content was captured, the location 305 where the media content was captured, key words 306 spoken when the media content was captured, voices 307 audibly occurring when the media content was captured, imagery 308 occurring when the media content was captured, environmental data 309 occurring when the media content was captured, contextual data 310 occurring when the media content was captured, and other devices 311, proximities, and engagements.

Illustrating by example, consider the situation when an authorized user of the electronic device (100) uses one or more sensors (114) of the electronic device (100) to capture media content, e.g., a short video clip, at the beach with their family. In one or more embodiments, the episodic data of the episodic data summary 303 being captured and stored in the episodic memory by the AI engine (116) during the capture of the media content (and perhaps shortly prior to capturing the media content and shortly after capturing the media content) is automatically attached or tagged or saved to the media content as a episodic memory window 302. In one or more embodiments, the episodic memory window 302 includes episodic data relating to people 312 present during the media content capture, voices 307 occurring during the media content capture, key words 306 spoken during the media content capture, the location 305 of the electronic device when the media content was captured, the time 304 at which the media content was captured, imagery 308 or scenic snapshots of the environment where the media content is captured, what other electronic devices 311 are nearby when the media content was captured, and so forth.

In one or more embodiments, each episodic memory window 302 stored in the episodic memory 209 is designed to refresh, create, or encourage, the remembering of episodic memories the mind of the user of the electronic device 100 by storing episodic elements in the form of the episodic data summary 303 when the AI engine (116) extracts the same from unstructured data received from the various sensors (114) of the electronic device 100. Advantageously, the use of an episodic memory 209 provides an indexed episodic memory window 302 providing information relating to particular and specific events and situations occurring when a control operation, such as a media content capture event, occurs. By attaching a episodic memory window 302 to media content and storing the same in the memory (105) of the electronic device (100), presentation of the episodic data summary 303 can occur when a user of the electronic device (100) attempts to transmit the media content to another electronic device. This episodic data summary 303 can specify time 304 and location 305, the names of people 312, events, behaviors 313, and can provide other various semantic tags. The use of the episodic memory window 302 is advantageous in confirming whether a user does indeed desire to transmit media content to another electronic device because embodiments of the disclosure contemplate that users of electronic devices often recall, and communicate about, the past in terms of their human episodic memories rather than in terms of high granularity facts, times, and dates.

Turning now back to FIG. 1, in one or more embodiments the AI engine 116 is responsible for receiving cumulative data from the various sensors 114 of the electronic device 100 and extracting episodic event data for inclusion in the episodic memory windows (301). The AI engine 116 can ingest unstructured data captured by the one or more sensors 114 from the environment 111 and extracting episodic data representing at least one episodic event and configured to trigger episodic events from the user's memory when the user reviews the episodic memory window (302), the episodic data summary (303), or episodic data taken from the episodic memory window (302) on the user interface 102 of the electronic device 100.

In so doing, the AI engine 116 can extract episodic data from the unstructured data to refresh a user's mind regarding times where media content was captured, places where media content was captured and other contextual information related to the who, what, when, where, why, or how the media content was captured. Working in tandem with the face analyzer 122, the expression detector 123, the context engine 120, and or an environmental analyzer 127, the AI engine 116 can associated emotions, names, identities, and other information with media content capture as well. Advantageously, when a user of the electronic device 100 desires to share media content by transmitting the media content to another electronic device, presentation of the episodic data can identify episodic events in the user's mind to confirm that there is no component of the media content that the user would prefer not to share. The presentation of episodic data at the user interface 102 while the one or more processors 104 at least temporarily preclude the transmission of media content helps to allow the user to quickly remember and recall the event, time, place, or setting where the media content was captured.

In one or more embodiments, by continually monitoring the unstructured data received from the one or more sensors 114, the AI engine 116 continually learns about the who, where, when, actions, engagements, and changes pertaining to authorized users of the electronic device 100. As such, the AI engine 116 continually becomes "smarter" about each authorized user of the electronic device 100. In one or more embodiments, the AI engine 116 thus constantly learns experiences, specifics, personal preferences, history and habits of each of the authorized users of the electronic device 100.

In one or more embodiments, the one or more processors 104 can include, or be operable with, an AI engine 116. The AI engine 116 can be operable with the input devices of the electronic device 100, which can include one or more microphones, one or more image capture devices, depth scanners, temperature sensors, or other input devices. In one or more embodiments the AI engine 116 is capable of machine learning, which can include a series of processes for ingesting information and finding patterns, formulas, models, or other constructs that describe the unstructured data received from these input devices to extract episodic data suitable for storage in the plurality of episodic memory windows (301) stored in the episodic memory (209) of the memory 105. These processes can represent and/or generalize the information in one or more embodiments. Representation can include data evaluation, while generalization can include processing additional information. Predictions can be used to provide answers to inquiries. When an answer is given, processes predicting informational meanings, comparing predicted answers and actual answers, and updates of prediction functions in view of determined distances can occur repeatedly. These processes can be constructed as one or more workflows within the AI engine 116 in one embodiment.

In one or more embodiments, the AI engine 116 can transform unstructured data received from the one or more sensors 114 of the electronic device 100, using workflows or algorithms, into the episodic data stored in each episodic memory window (302). The AI engine 116 can perform self-learning operations to better extract the episodic data from the unstructured data. The AI engine 116 can perform self-learning operations using various algorithms, transforming data to an execution code level, executing algorithms, and transforming the results into knowledge as well.

In one or more embodiments, the AI engine 116 can be operable with an aggregation of learned knowledge, including all information ingested by the AI engine 116. When, for example, information is abstracted and classified based on user and domain type, the information can be transformed into machine-learned knowledge.

In one or more embodiments, one or more sensors 114 of the electronic device 100 continually capture unstructured data from the environment of the electronic device 100. In one or more embodiments, the AI engine 116 then continually abstracts episodic data forming an episodic data summary (303) that is stored in an episodic memory window (302) that is one of a plurality of episodic memory windows (301) stored in the episodic memory (209). When a sensor, such as the imager 112, captures media content, such as an image, in one or more embodiments the one or more processors 104 attach an episodic memory window (302) comprising an episodic data summary (303) containing episodic data abstracted from the time when the media content was captured.

The data abstracted by the AI engine 116 and stored as episodic data in episodic memory windows (301) in the episodic memory (209) can be advantageously used to ensure that media content selected by a user of the electronic device 100 for sharing is indeed media content that the user intends to share. In one or more embodiments, when the user interface 102 receives user input requesting transmission of the media content to another electronic device, the one or more processors 104 extract an episodic data summary (303) that is attached to the media content and present that episodic data summary (303) at the user interface 102 in response to the user input. In one or more embodiments, the one or more processors 104 also preclude transmission of the media content to the other electronic device while the episodic data summary (303) is being presented at the user interface 102.

The user can then review the episodic data summary (303) to determine whether the selected media content is indeed the media content that the user intends to share. In one or more embodiments, after presenting the episodic data summary (303) at the user interface 102, and allowing the user time to review the same, the one or more processors 104 prompt for additional authorization to transmit the media content to the other electronic device. In one or more embodiments, this prompting occurs while the episodic data summary (303) is being presented.

The prompt might say, "now that you have reviewed this episodic memory window—are you sure you want to send or post this content?" Presuming that the selected media content is indeed media content that the user intends to share, which is confirmed by reviewing the episodic data summary (303), in one or more embodiments the user can deliver the additional authorization to the user interface 102. Accordingly, the user may deliver an additional authorization to the user interface 102, such as by touching a user actuation target marked "yes" or "send." In one or more embodiments, when the one or more processors 104 receive the additional authorization at the user interface 102 while at least temporarily precluding the transmission of the media content to the other electronic device, they cease the at least temporarily precluding the transmission and instead cause a communication device 106 to transmit the media content to the other electronic device.

This preclusion of transmission, which occurs until the user has had an opportunity to review the episodic data summary (303), serves as a "circuit breaker" that at least temporarily prevents or blocks media content that could be private, personal, or sensitive from being inadvertently transmitted from the electronic device 100 to another electronic device. This circuit breaker allows the person requesting the transmission of the media content to pause, reconsider, and optionally verify that the sharing of the media content is intentional. This circuit breaking process is shown in subsequent figures illustrating one or more method steps that can be used with the electronic device 100 of FIG. 1.

Figure 4A:
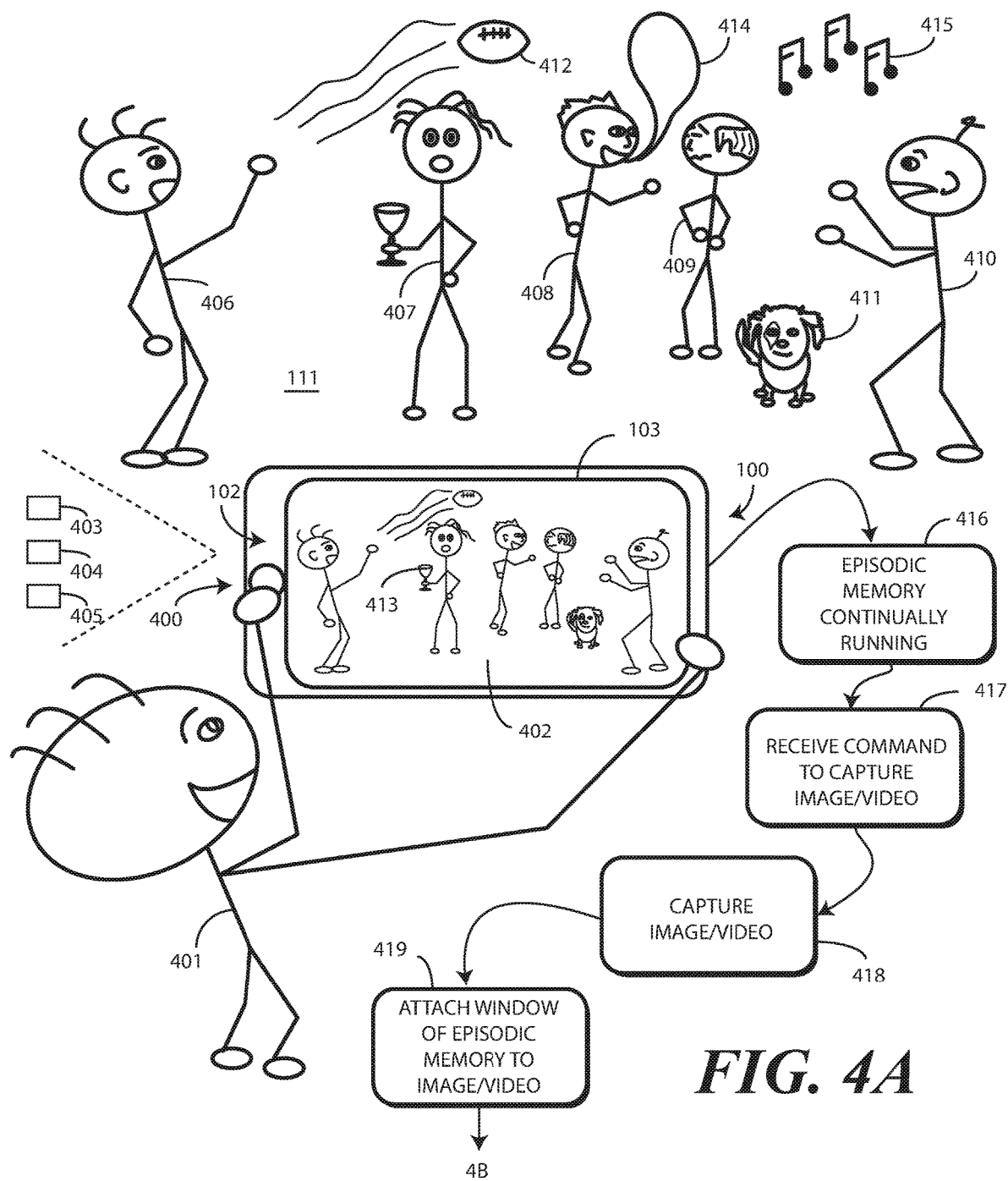
FIG. 4A illustrates one or more explanatory method steps in accordance with one or more embodiments of the disclosure.

Beginning with FIG. 4A, a person 401, who may the the authorized user of the electronic device 100, is using the electronic device 100 of FIG. 1 to capture media content 402 using one or more sensors (114) of the electronic device 100. In this illustrative example, the media content 402 is a picture that is being captured by the imager (112) of the electronic device 100 from an environment 111 of the electronic device 100. While images are one example of media content 402 that the one or more sensors (114) of the electronic device 100 can capture, embodiments of the disclosure are not so limited. Other examples of media content 402 comprise captured video 403, captured audio 404, captured screenshots 405, which can be captured text or multimedia messages, captured emails, captured websites, other media content, and/or combinations thereof. Other examples of media content 402 that can be captured by the one or more sensors (114) of the electronic device 100 will be obvious to those of ordinary skill in the art having the benefit of this disclosure.

As shown in FIG. 4A, a plurality of persons 401,406,407, 408,409,410 is situated within the environment 111 of the electronic device 100. Here, there are six persons 401,406, 407,408,409,410 situated within the environment of the electronic device 100. Person 401 is an authorized user of the electronic device 100, while persons 406,407,408,409, 410 are friends, family, or acquaintances of the authorized user.

In this illustration, used to more particularly describe various features and advantages of embodiments of the disclosure, there is a lot occurring. The scene set forth in the environment 111 of the electronic device 100 is not dissimilar to that which may occur at a family gathering, family reunion, school reunion, and so forth. In this illustration, person 406 is passing a football 412 to person 410. Person 407 is watching the action while sipping on a cocktail 413. Person 408 is having a conversation 414 with person 409. Music 415 is playing. A dog 411 is enjoying the weather and dreaming of his next meal. Desirous of memorializing this moment of joy and whimsy, person 401 wants to capture media content 402 in the form of an image from the environment 111.

As shown at step 416, in one or more embodiments the one or more sensors (114) of the electronic device 100, as well as the AI engine (116), are continually running in the background. This step 416 results in the one or more sensors (114) continually capturing unstructured data images, sounds, environmental data (date, time, temperature, weather, etc.), with the AI engine (116) abstracting that unstructured data into episodic data for storage in the episodic memory (209) of the electronic device 100. In one or more embodiments, step 416 comprises this artificial intelligence-driven episodic memory storage operation running continually in the background whenever the electronic device 100 is being used.

In one or more embodiments, step 416 can comprise the various sensors (114) of the electronic device 100 passively capturing the unstructured data and delivering it to the AI engine (116) while the electronic device 100 is operational. As used herein, "passively" means that an operation or action occurs automatically and without an affirmative instruction from a user. Thus, in one or more embodiments step 416 comprises the one or more sensors (114) of the electronic device 100 capturing the unstructured data from the environment 111 without any affirmative instruction from person 401.

Illustrating by example, in one embodiment at step 416 an audio input (109) of the electronic device 100 captures unstructured data from the environment 111 by receiving audio input. For instance, one or more microphones may capture audio input on a rolling basis at step 416, with the AI engine (116) abstracting key spoken words for storage in an episodic memory window (302) stored in the episodic memory (209).

Similarly, step 416 can comprise the imager (112) of the electronic device 100 capturing imagery from the environment 111, with the AI engine (116) abstracting key images highlighting the nature of the event occurring in the environment. In one or more embodiments, the capture of images and/or audio input can be combined. Step 416 can comprise the imager (112) of the electronic device 100 capturing a predetermined amount of video input from the environment 111 of the electronic device 100 as well.

The AI engine (116) can then abstract episodic data from the unstructured data received from the one or more sensors (114) at step 416. Illustrating by example, the AI engine (116), working with the imager processor system (110) may attempt to identify one or more of the plurality of persons 406,407,408,409,410 who are captured in the unstructured data. If, for example, person 406 is a good friend of person 401, and is frequently within the environment 111 of the electronic device 100, the AI engine (116) may be able to identify that person 406, with that person's identity being stored in an episodic memory window (302) stored in the episodic memory (209). The AI engine (116) may work with the face analyzer (122) and/or environmental analyzer (127) to determine that there are depictions of the one or more persons 406, 407,408,409,410 unstructured data received from the one or more sensors (114).

Alternatively, the AI engine (116) may employ other techniques to abstract episodic data from the unstructured data as well. For instance, when the audio input (109) captures audio at step 416, the AI engine (116) may perform audio processing on the audio input to determine that there are multiple speakers within the environment 111. The AI engine (116) may take advantage of optical recognition techniques performed by the authentication system (113), operating in conjunction with the face analyzer (122) and/or environmental analyzer (127), to identify any person who has corresponding identifying characteristics stored with the image or depth scan data in the memory (105) from the unstructured data. In another embodiment, step 416 can comprise the AI engine (116) identifying these persons 406,407,408,409,410 using a voice recognition engine incorporated into the audio input/processor (108).

In addition to identifying people within the environment 111, the AI engine (116) can identify other elements from the environment 111 for storage in an episodic memory window (302) stored in the episodic memory (209). Illustrating by example, objects and landmarks can be abstracted from the unstructured data at step 416. The AI engine (116) may employ optical recognition in conjunction with the environmental analyzer (127) to identify objects or locations within the environment 111. The same optical recognition can be used to determine that the dog 411 is Brownie, the dog belonging to person 401. Vehicles, houses, historic landmarks, and geographic formations can be identified as well. Optical recognition can be used to read signs and billboards as well. The AI engine (116) can then store this abstracted information in an episodic memory window (302) stored in the episodic memory (209).

The AI engine (116) may work with unstructured data from the location detector (115) at step 416 to determine where the electronic device 100 is located during capture of the media content 402 for storage in an episodic memory window (302) stored in the episodic memory (209). The AI engine (116) can use audio recognition techniques to identify, for example, the music 415 at step 416. The AI engine (116) can optionally transcribe snippets of audio input to transcribed text for storage in in an episodic memory window (302) stored in the episodic memory (209) at step 416.

The AI engine (116) may abstract at least one contextual cue from the environment for storage in an episodic memory window (302) stored in the episodic memory (209) from the unstructured data at step 416. Illustrating by example, the AI engine (116) may analyze audio input or transcribed text for laughter or sobbing to determine if someone is happy or sad. Image data can be analyzed to determine a person's emotions, such as whether they are quiet, happy, sad, laughing, angry, soft, loud, agitated, or experiencing another emotion. Additionally, image data can be analyzed to determine lip or mouth movement, in sync with captured audio, to determine who says what.

Accordingly, in one or more embodiments step 416 comprises the AI engine (116) receiving unstructured data from the environment 111 of the electronic device, analyzing and processing the unstructured data to obtain episodic data for storage in an episodic memory window (302) stored in the episodic memory (209), and causing the same to be stored. Thus, the episodic data stored at step 416 can include objects in the media content 402, names or the persons 406,407, 408,409,410 depicted, faces of the persons 406,407,408,409, 410 depicted, landmarks, and so forth. From audio content, family voices, laughter, and spoken words can be identified and/or transcribed. Location data can be recorded at step 416 as well. Emotions of the persons 406,407,408,409,410 can be determined. Music 415 playing in the environment can be identified as well. Other examples of content that can be identified at step 416 will be obvious to those of ordinary skill in the art having the benefit of this disclosure. For example, the AI engine (116) may abstract keywords spoken, imagery or scenery from the environment 111, the identification of other electronic devices within the environment, or other proximities and engagements.

At step 417, person 401 delivers user input 400 to the user interface 102 of the electronic device 100 requesting that the media content 402 be captured. This user input 400 can take a variety of forms, including that of pressing to a button with a finger, touching a user interface target presented on the display 103, delivering an audio command to an audio input (109) of the electronic device 100, delivering gesture input to the user interface 102 of the electronic device 100, delivering touch or gesture input to a companion device of the electronic device 100, such as a smart watch, and so forth. Other examples of user input 400 will be obvious to those of ordinary skill in the art having the benefit of this disclosure.

At step 418, the one or more sensors (114) of the electronic device 100 capture the media content. At step 419, the one or more processors (104) of the electronic device 100 attach, as metadata in one or more embodiments, an episodic memory window (302) spanning the time during which the media content 402 was captured to the media content 402.

Turning now to FIG. 4B, at some later time, the person 401 wants to transmit the media content 402 to another electronic device 100, as shown at step 420. Accordingly, the person 401 delivers, at the user interface 102 of the electronic device 100, user input 421 requesting transmission of the media content 402 to another electronic device.

At step 420, the user interface 102 of the electronic device 100 receives the user input 421 requesting transmission of the media content 402 to another electronic device 422. In this example, the user input 421 is requesting transmission of the media content 402 to another electronic device 422 across a network 126. Specifically, the person 401 is requesting that the media content 402 be sent in the form of a multimedia message 427 to a person named Buster. The multimedia message 427 includes a heading line saying, "Check this out!" as the person 401 is particularly excited about the shenanigans captured in the media content 402. As such, the person 401 wants Buster to share in the antics. Accordingly, the person 401 delivers user input 421 to the user interface 102 requesting that the media content 402 be transmitted to another electronic device 422 belonging to Buster.

It should be noted that the other electronic device 422 could be any of a number of electronic devices. For example, in one embodiment, the other electronic device 422 comprises a portable electronic device such as a smartphone or tablet computer that belongs to a friend, stranger, or other acquaintance of the person 401. For example, the other electronic device 422 could be another smartphone belonging to Buster, who is the intended recipient of the image in this example. In another embodiment, the other electronic device 422 is a computer. In still other embodiments, the other electronic device 422 is a server. The server could be a cloud server (125), a personal server, web server, a social media server, commercial server, private server, institutional server, academic server, non-profit server, or other type of server configured to receive media content 402 from electronic devices across the network. For example, rather than sending a multimedia message 427 to a smartphone belonging to Buster, in another embodiment the person 401 may want to share the image with Buster by posting the image to a server (125) operated by a social media service while tagging Buster in the image. Other examples of electronic devices to which media content 402 may be transmitted in accordance with embodiments of the disclosure will be obvious to those of ordinary skill in the art having the benefit of this disclosure.

In one or more embodiments, a default mode of the electronic device 100 initially prevents the media content 402 from being shared in response to the user input 421 received at step 420. Said differently, in one or more embodiments the one or more processors (104) of the electronic device 100 operate in a default mode to prevent any applications from accessing the media content 402 so as to be able to share it by causing the communication device (106) of the electronic device 100 to transmit the media content 402 to another electronic device 422.

In this example, as shown at step 423, the one or more processors (104) of the electronic device 100 at least temporarily preclude, in response to the user input 421 received at step 420, the transmission of the media content 402 to the other electronic device 422. As used herein, "at least temporarily preclude" means preventing the transmission of the media content 402 for a duration sufficient to allow the person 401 to reconsider, again determine, reassess, or otherwise confirm that they do actually intend to cause the media content 402 to be transmitted to the other electronic device 422.

In this illustrative example, the at least temporarily precluding occurring at step 423 continues until the person 401 has reviewed episodic data attached to the media content 402. Specifically, step 424 comprises one or more processors (104) of the electronic device 100 presenting, in response to the user input 421 at the user interface 102 of the electronic device 100, episodic data 427 detected by the one or more sensors (114) of the electronic device 100 during the capture of the media content 402. In one or more embodiments, step 424 comprises the one or more processors (104) of the electronic device 100 further extracting the episodic data 427 from an episodic memory window (302), obtained from an episodic memory (209) of the electronic device 100 and attached as metadata to the media content 402. In one or more embodiments. The episodic memory window (302) comprises a single file attached as the metadata to the media content 402.

As shown at step 426, in this illustration the episodic memory window (302) comprises episodic data 427 abstracted from unstructured data received from one or more sensors (114) of the electronic device 100 and stored in a working operations memory (205) during a data capture window (which is a period of time spanning from a time before the media content 402 was captured, i.e., a predefined pre-capture duration, to another time after the media content 402 was captured, i.e., a predefined post-capture duration, in one or more embodiments) for use by the AI engine (116) of the electronic device 100.

In one or more embodiments, the episodic data 427 extracted from the episodic memory window (302) attached to the media content 402 identifies one or more abstracted elements identified by the AI engine (116) as summarizing events occurring within the environment (111) of the electronic device 100 during the data capture window. For example, the episodic data 427 extracted from the episodic memory window (302) can identify one or more persons (312) situated within the environment (111) of the electronic device 100 when the media content 402 was captured, one or more key words (306) spoken in the environment (111) when the media content 402 was captured, or identification of other electronic devices (311) situated within the environment (111) when the media content 402 was captured.

In this illustration, the episodic data 427 extracted from the episodic memory window (302) attached to the media content 402 indicates that the event occurring at the environment (111) was the birthday of the person 401 occurring during the year 2007. The episodic data 427 extracted from the episodic memory window (302) attached to the media content 402 indicates that Henry, Emma, Tommy, Buster, and Mac were present in the environment (111) of the electronic device 100 when the media content 402 was captured. The episodic data 427 extracted from the episodic memory window (302) attached to the media content 402 indicates that the location of the electronic device 100 when the media content 402 was captured was Grant Park.

The episodic data 427 extracted from the episodic memory window (302) attached to the media content 402 indicates that the weather was rainy, but that a touch football game commenced when the rain stopped. The episodic data 427 extracted from the episodic memory window (302) attached to the media content 402 indicates some key words (306), namely, that Henry yelled, "You can't catch." The episodic data 427 extracted from the episodic memory window (302) attached to the media content 402 indicates contextual information, including the fact that Tommy laughed at a joke.

In this illustrative example, the episodic data 427 extracted from the episodic memory window (302) attached to the media content 402 also indicates that the person 401 sent the media content 402 to everyone in attendance. Recall that at step 420 the person 401 was attempting to send the media content 402 to Buster, who was in attendance and who therefore received a copy of the image.

The presentation of the episodic data 427 at the user interface 102 allows the person 401 to see a snapshot, i.e., an episodic data summary (303) of key content for quick review prior to sharing the media content 402. If, for example, the media content 402 contained private or sensitive content, this fact may be triggered in the mind of the person 401 upon reviewing the episodic data 427, which may cause the person 401 not to transmit the media content 402 to the other electronic device 422. In this example, the episodic data 427 indicates that the media content 402 has already been shared with Buster, which may cause the person 401 not to send the media content 402 to Buster again.

In one or more embodiments, to ensure the person 401 has had an opportunity to consider the episodic data 427 presented at the user interface 102, the one or more processors (104) of the electronic device 100 prompt 428, at step 425, for additional authorization to transmit the media content 402 to the other electronic device 422. In one or more embodiments, this prompting 428 occurs while the one or more processors (104) of the electronic device 100 are at least temporarily precluding the transmission of the media content 402 to the other electronic device 422 in response to the user input 421 received at step 420 requesting transmission of the same.

In this example, the one or more processors of the electronic device 100 prompt 428 for additional authorization to transmit the media content 402 to the other electronic device 422 by presenting a message on the user interface 102 of the electronic device 100. In this illustrative embodiment, the message simply requests that the person 401 touch a user actuation target 429 presented on the display 103. However, in other embodiments the additional authorization required to override the preclusion of transmission initiated at step 424 requires information that only the authorized user of the electronic device 100 would know.

For example, in another embodiment, the additional authorization required to override the preclusion of transmission initiated at step 424 is in the form of a personal identification number (PIN). In other embodiments, the additional authorization will comprise entry of a password, a performance of a gesture on, or near, the user interface 102 of the electronic device 100, making a gesture translating the electronic device 100 in three-dimensional space, delivering a voice command to the electronic device 100, or some other manipulation of the electronic device 100 in response to the prompt 428.

In still other embodiments, the additional authorization may comprise authentication information corresponding to the authorized user of the electronic device 100. Illustrating by example, the one or more processors of the electronic device 100 may require biometric information to be delivered to the electronic device 100 such as a fingerprint, iris scan, face scan, facial image, voice print, or other authenticator confirming that the person 401 delivering the user input 421 at step 420 is indeed the authorized user of the electronic device 100. Other examples of additional authorization will be described below. Still others will be obvious to those of ordinary skill in the art having the benefit of this disclosure.

In this illustrative example, the message comprises an indicator explaining that the one or more processors (104) of the electronic device 100 have at least temporarily precluded the transmission of the media content 402 in response to the user input 421 received at the user interface 102 at step 420. In this example, the message states, "Do you still want to send?"

Figure 4C:
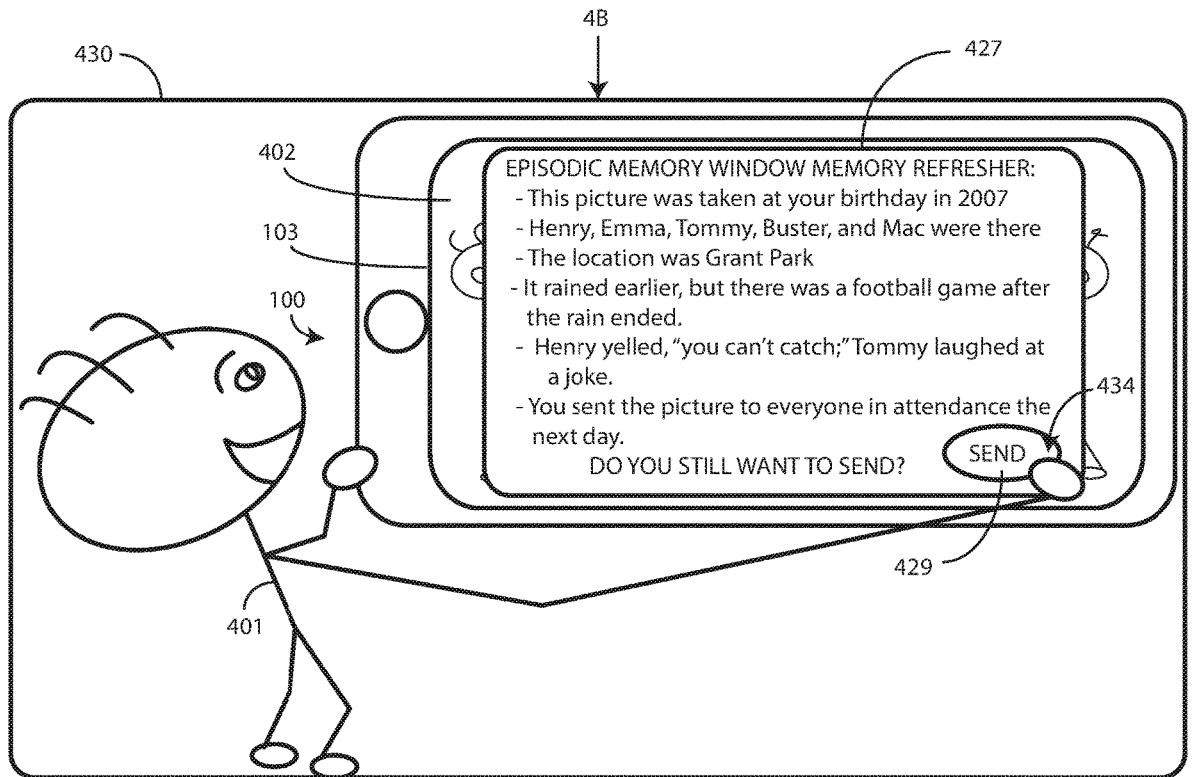
FIG. 4C illustrates one or more explanatory method steps in accordance with one or more embodiments of the disclosure.
Figure 4C:
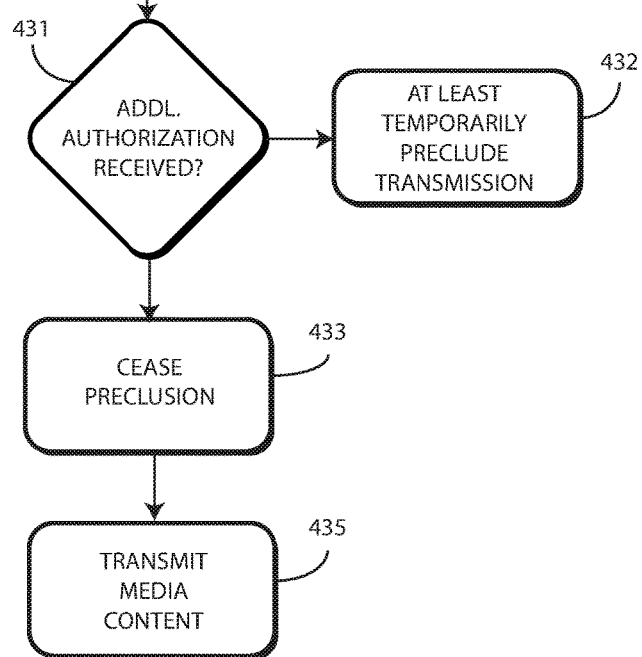

Turning now to FIG. 4C, in this example the person 401 wants to remind Buster of just how great a time they had at the party. Accordingly, despite having transmitted the media content 402 once before, the person 401 wants to transmit it again after reviewing the episodic data 427 presented on the display 103.

Since the person 401 is indeed sure he wants Buster to see the image of the party, at step 430 the person 401 delivers the additional authorization 434 to the user interface 102 in the form of additional user input. The one or more processors (104) of the electronic device 100 thus receive, at step 430, the additional authorization 434 to transmit the media content 402 to the other electronic device (422). In one or more embodiments, this receipt of the additional authorization 434 occurs while the one or more processors (104) of the electronic device 100 at least temporarily preclude the transmission of the media content 402 to the other electronic device (422). In this example, the person 401 delivers the additional authorization 434 by actuating a user actuation target 429, shown here as a "send" icon presented on the touch-sensitive display of the electronic device 100, causing the additional authorization 434 to be delivered to the one or more processors (104) of the electronic device 100.

At decision 431, the one or more processors (104) of the electronic device 100 determine whether the additional authorization requested at step (425) has been received. If it were not, in one or more embodiments the at least temporary preclusion of transmission of the media content 402 continues at step 432.

In one or more embodiments, since the additional authorization 434 was received in this example, step 433 then comprises the one or more processors of the electronic device 100 ceasing, in response to receiving the additional authorization 434 to transmit the media content 402 to the other electronic device (422) at step 430, the at least temporarily precluding the transmission of the media content 402 to the other electronic device (422). Step 435 then comprises the one or more processors (104) of the electronic device 100 causing, in response to the ceasing at step 433, the communication device (106) of the electronic device 100 to transmit the media content 402 to the other electronic device (422).

As noted above, while the media content 402 comprises an image in this illustration, embodiments of the disclosure are not so limited. The media content 402 can comprise captured video (403), captured audio (404), captured screenshots (405), captured text messages, captured emails, or any content that can be inputted to electronic device 100, or combinations thereof. Other examples of media content 402 will be obvious to those of ordinary skill in the art having the benefit of this disclosure.

Accordingly, in one or more embodiments the method depicted in FIGS. 4A-4C elevates personal data security and user privacy pertaining to media content 402 by requiring a person to review episodic data 427 prior to overriding a default preclusion of transmission of the media content 402. Using the method depicted in FIGS. 4A-4C, when a person or authorized user of the electronic device 100 attempts to share media content 402 delivering user input 421 to a user interface 102 of the electronic device 100, one or more processors (104) of the electronic device 100 at least temporarily preclude any transmission of the media content 402 by the communication device (106) of the electronic device 100 in a default mode of operation. Instead, in one or more embodiments the media-sharing action causes one or more processors (104) of the electronic device 100 to present episodic data 427 from the episodic memory window (302) on the user interface 102 of the electronic device 100 for review by the person or authorized user of the electronic device 100. Said differently, this media-sharing action triggers presentation from the episodic memory (209) the captured episodic memory window (302) relating to the media content (402) attempting to be shared.

The person or authorized user then sees the episodic data summary (303), for example, on the display 103 of the electronic device 100. The episodic data summary (303) summarizes key content for quick review. If the person or authorized user does indeed want to transmit the media content 402 after reviewing the episodic data summary (303), they may deliver additional authorization 434 to the user interface 102 of the electronic device 100 to override the temporary preclusion of transmission. Upon receiving the additional authorization 434, the one or more processors (104) of the electronic device 100 can cease the at least temporary preclusion of transmission and can instead cause a communication device (106) of the electronic device 100 to transmit the media content 402 in accordance with the original user input 421 received at the user interface 102 requesting the same.

Figure 5:
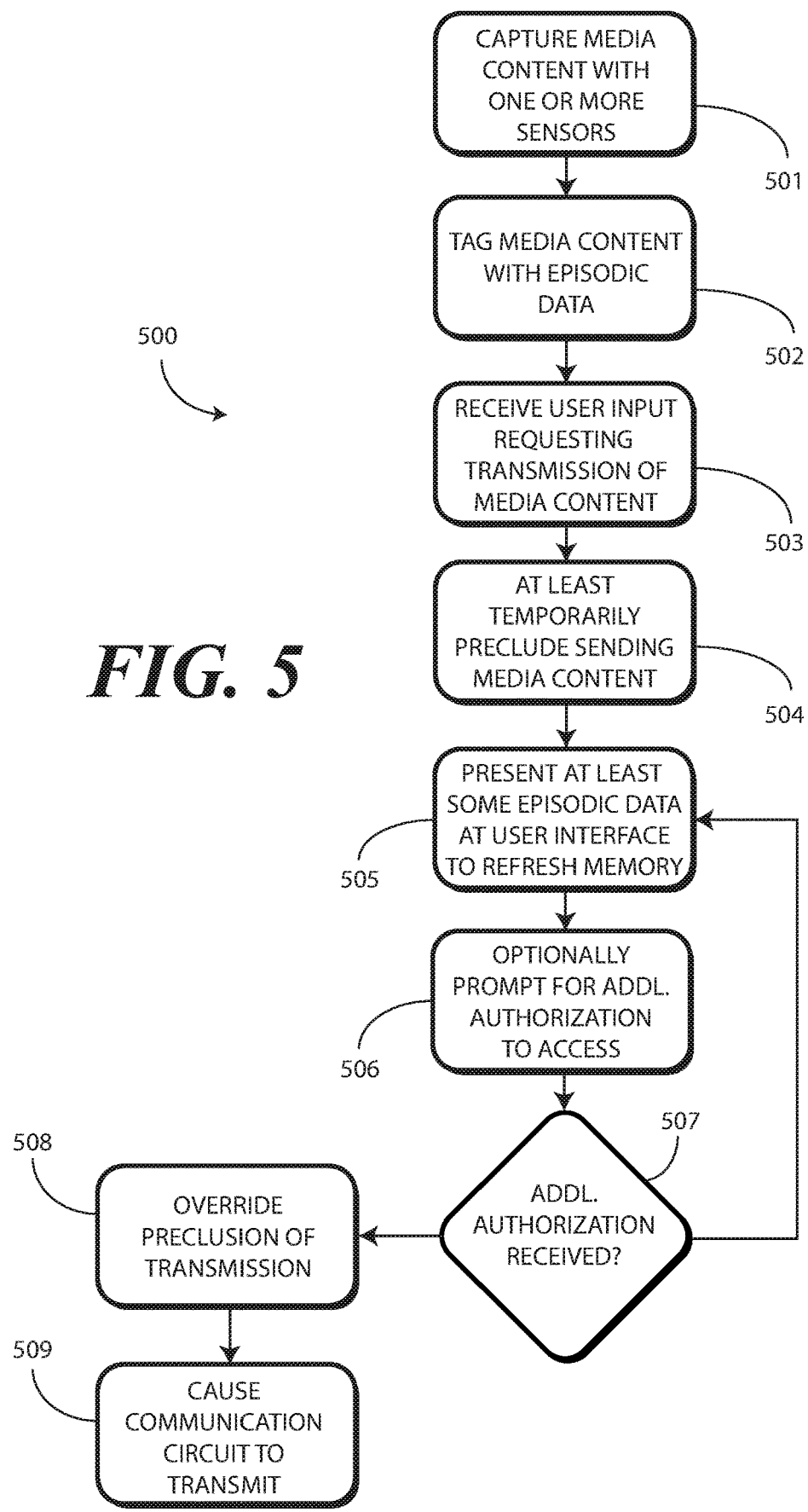
FIG. 5 illustrates one explanatory method in accordance with one or more embodiments of the disclosure.

Turning now to FIG. 5, illustrated therein is yet another method 500 in accordance with one or more embodiments of the disclosure. The method 500 of FIG. 5 begins in a similar manner to the method depicted in FIGS. 4A-4C. Beginning at step 501, one or more sensors of an electronic device capture media content from an environment of the electronic device. At step 502, one or more processors of the electronic device attach at least an episodic data summary extracted from an episodic memory window stored in an episodic memory of a memory of the electronic device to the media content.

In one or more embodiments, the episodic data summary is taken from one episodic memory window of a plurality of episodic memory windows that are continuously being stored in the episodic memory in background operation by an AI engine. In one or more embodiments, step 502 comprises tagging the media content captured at step 501 with the episodic data summary at the time of capture to create a contextual summary associated with the media content. In one or more embodiments, the episodic data summary contained in, or extracted from, the episodic memory window provides a summary of the media content that allows an authorized user of an electronic device to quickly assess the contents of the media content prior to any transmission of the same.

At step 503, a user interface of the electronic device receives user input requesting transmission of the media content to another electronic device. In this particular method, the user input requesting the transmission of the media content to the other electronic device comprises a request for a predefined application operating on the one or more processors to cause the transmission of the media content to the other electronic device. For example, the user input received at step 503 may cause an electronic mail application or text application or social media application to launch and attempt to access the media content for transmission to another electronic device, such as an email server, text server, social media server, or other electronic device.

In one or more embodiments, step 504 then comprises at least temporarily precluding, with one or more processors of the electronic device in response to the user input received at step 503, the transmission of the media content to the other electronic device. In one or more embodiments, step 504 comprises at least temporarily precluding the predefined application actuated with the user input received at step 503 from access, selecting, attaching, or otherwise manipulating the media content.

In one or more embodiments, when the user interface of the electronic device receives user input requesting transmission of the media content to another electronic device at step 503, one or more processors of the electronic device present the episodic data summary at the user interface at step 505 to override the sharing restriction initiated at step 504. The one or more processors may further prompt for additional authorization to transmit the media content to the other electronic device while presenting the episodic data summary at the user interface at step 505. The presentation of this episodic data summary, which may be extracted from an episodic memory window, provides an executive summary to the authorized user of the electronic device alerting them to episodic details associated with the media content, allows the authorized user to ensure that they do indeed intend to transmit the media content to the other electronic device.

In one or more embodiments, provided that the authorized user does indeed intend to transmit the media content, they may deliver additional authorization to transmit the media content to the other electronic device at the user interface while the one or more processors at least temporarily preclude the transmission of the media content, as determined by decision 507. The one or more processors, in response to receiving this additional authorization, can then cease the at least temporarily precluding of the transmission at step 508 and cause a communication device to transmit the media content to the other electronic device at step 509. Otherwise, the at least temporarily precluding continues at step 505.

Figure 6:
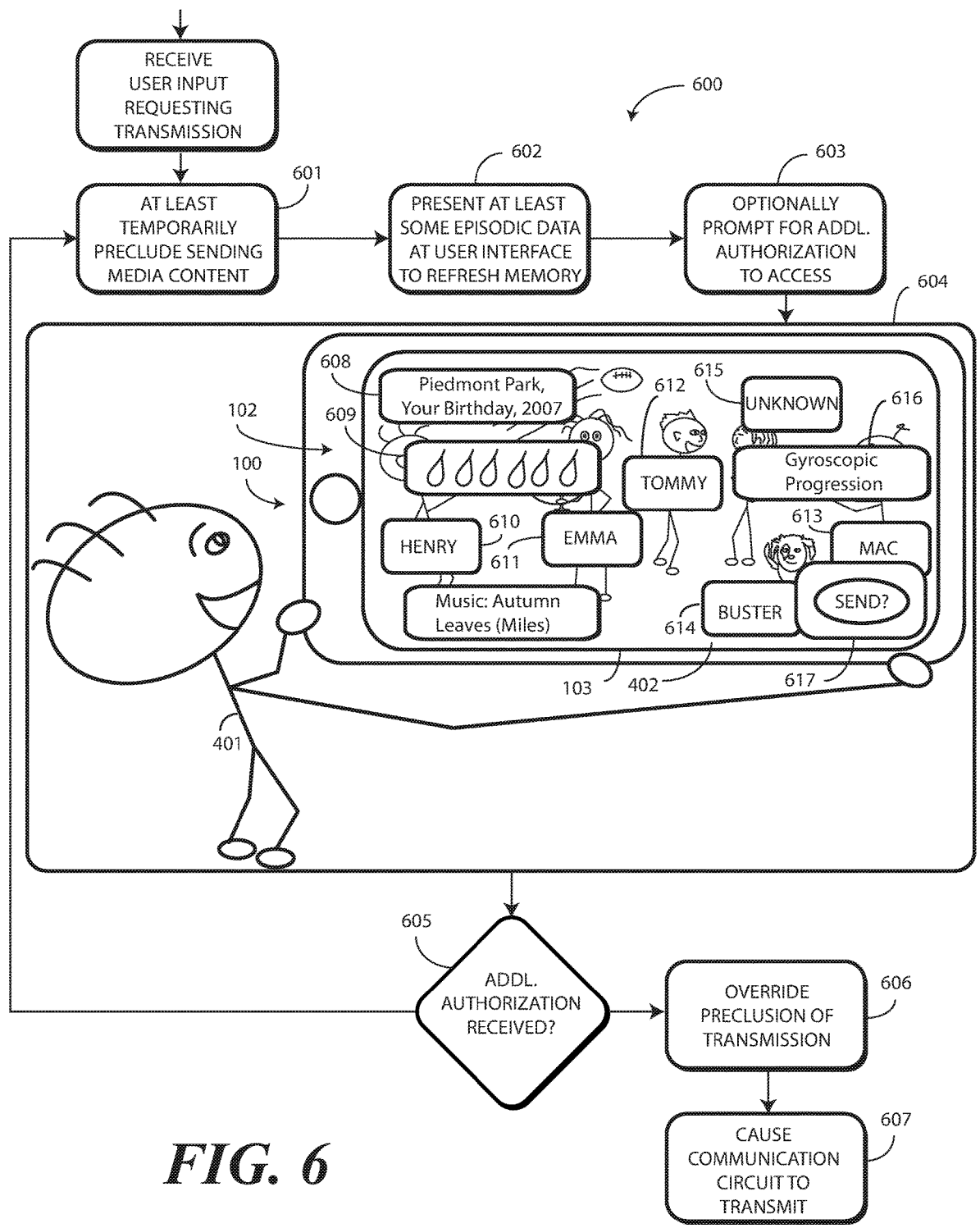
FIG. 6 illustrates another explanatory method in accordance with one or more embodiments of the disclosure.

Turning now to FIG. 6, illustrated therein is another method 600 in accordance with one or more embodiments of the disclosure. To this point, the information presented to a user prior to transmission has included episodic data, an episodic data summary, and/or an episodic memory window that are presented directly to the person attempting to transmit the media content. In the method 600 of FIG. 6, rather than presenting information from an episodic memory window, the media content 402 has been augmented with visible representations of simple tagged metadata.

As before, when the user interface 102 of the electronic device 100 receives user input requesting transmission of the media content 402 to another electronic device, step 601 comprises one or more processors (104) of the electronic device 100 precluding transmission of the media content to the other electronic device. Step 602 then comprises the one or more processors (104) presenting, in response to the user input requesting transmission of the media content 402 to the other electronic device, at least some metadata attached to the media content at the user interface 102. Step 602 then comprises prompting for additional authorization to transmit the media content 402 to the other electronic device.

The result of step 601, step 602, and step 603 is shown in step 604. In one or more embodiments, this metadata comprises a visible representation of at least some metadata captured by one or more sensors (114) of the electronic device 100. As before, this metadata being presented provides a summary of events occurring within an environment of the electronic device when the media content was captured.

While the metadata could be an episodic memory window attached to the media content when the media content was captured, and presented in the form of a single banner superimposed atop the media content 402, as was the case in FIGS. 4B-4C, in this embodiment the metadata is simply tagged information detected by the one or more processors (104) of the electronic device 100 when the media content 402 was captured. Moreover, at step 604, this tagged metadata has been strategically placed as visible representations, configured as banner labels, across the media content 402 to collocate each visible representation with a portion of the media content 402.

Illustrating by example, banner label 608, placed at the upper left corner of the media content 402, indicates the location and event. Banner label 609 indicates that it rained. Banner labels 610,611,612,613 indicate that Henry, Emma, Tommy, and Mac were present. Banner label 614 indicates Brownie was at the party. Banner label 615 indicates that someone who was unable to be identified by the one or more processors (104) was also present. Banner label 616 identifies some key words that were spoken. Banner label 617 comprises the prompt generated at step 603. These examples of banner labels are illustrative only, as numerous others will be obvious to those of ordinary skill in the art having the benefit of this disclosure.

At decision 605, the one or more processors (104) of the electronic device 100 determine whether the additional authorization requested by the prompt of step 603 has been received. Where it has, i.e., where the one or more processors (104) receive, at the user interface 102, the additional authorization to transmit the media content 402 to the another electronic device while precluding the transmission of the media content 402 to the another electronic device, step 606 comprises the one or more processors ceasing, in response to receiving the additional authorization to transmit the media content 402 to the other electronic device, the preclusion of the transmission of the media content 402 to the other electronic device. Step 607 then comprises the one or more processors (104) causing, in response to the ceasing, the communication device (106) of the electronic device 100 to transmit the media content 402 to the other electronic device.

It should be noted that any of the banner labels can be clear in some embodiments so that more of the media content 402 can be seen underneath. The same is true of the single banner used in FIGS. 4B-4C above. In other embodiments, one or both of the banner labels and/or the single banner can be opaque such that the episodic data and/or metadata are easier to read. Moreover, here the media content 402 is augmented by overlaying the banner labels atop the image. In other embodiments, a table on the side of the media content, optionally with arrows pointing to identified objects, can be used. Other configurations for augmentation will be obvious to those of ordinary skill in the art having the benefit of this disclosure.

In one or more embodiments, when the media content 402 has been augmented with the banner labels, the person 401 has the option of selectively enabling or disabling the banner labels so as to be more able to see the image. For example, the person 401 may tap the display 103 to make the banner labels disappear, thereby revealing the entire image. Alternatively, the person 401 may tap the display 103 again to make the banner labels appear.

Figure 7:
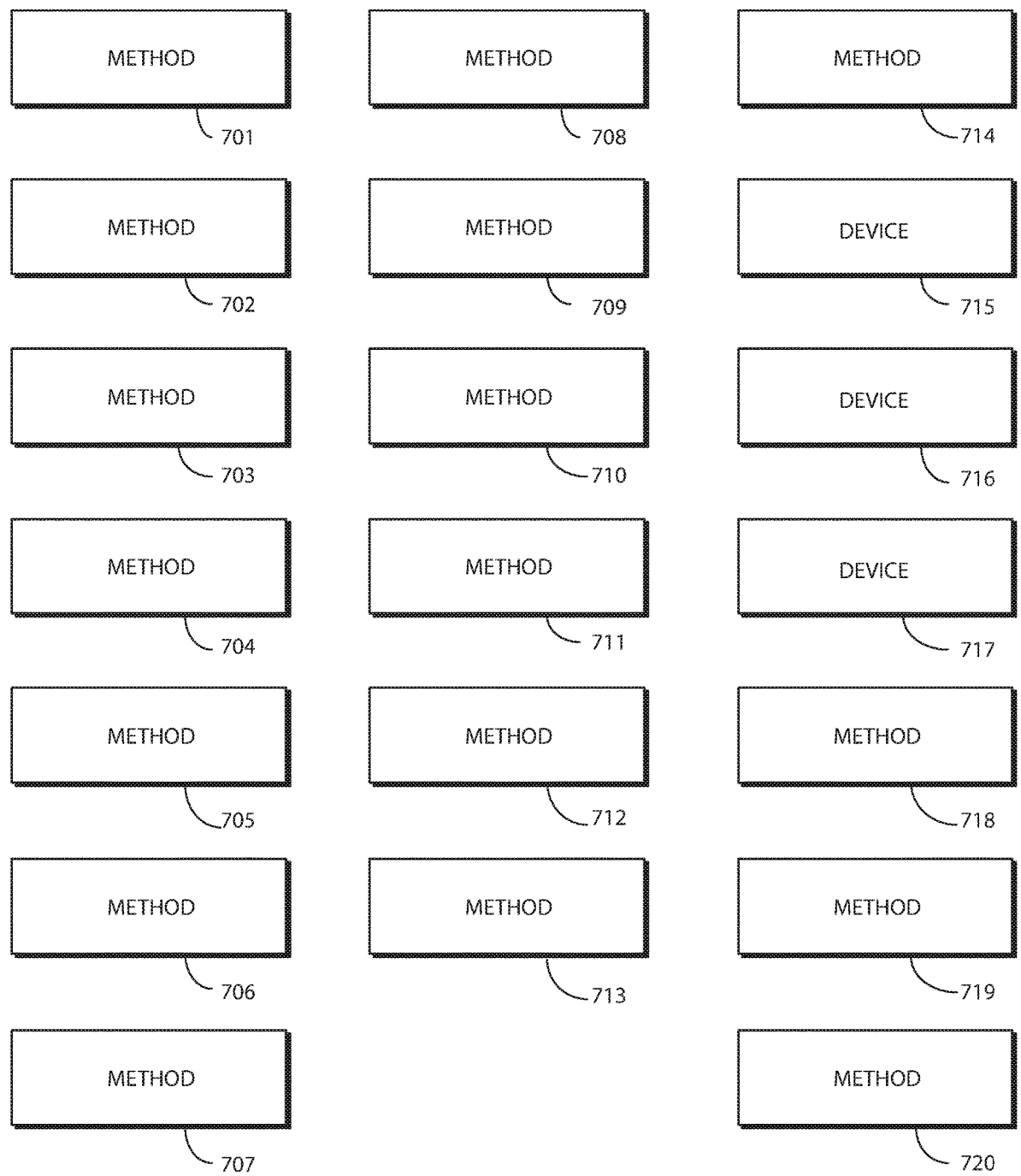
FIG. 7 illustrates various embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments by one of ordinary skill in the art having the benefit of this disclosure. Thus, the embodiments are shown as labeled boxes.

At 701, a method in an electronic device comprises receiving, at a user interface of the electronic device, user input requesting transmission of media content to another electronic device. At 701, the method comprises at least temporarily precluding, by one or more processors of the electronic device, transmission of the media content in response to the user input. At 701, the method comprises presenting, by the one or more processors in response to the user input at the user interface, episodic data detected by one or more sensors of the electronic device during capture of the media content.

At 702, the method of 701 further comprises prompting, by the one or more processors with or in response to the presenting the episodic data at the user interface, for additional authorization to transmit the media content to the other electronic device. At 702, the prompting occurs while at least temporarily precluding the transmission of the media content to the other electronic device.

At 703, the method of 702 further comprises receiving, at the user interface, the additional authorization to transmit the media content to the other electronic device while at least temporarily precluding the transmission of the media content to the other electronic device. At 703, the method of 702 further comprises ceasing, by the one or more processors in response to the receiving the additional authorization to transmit the media content to the another electronic device, the at least temporarily precluding the transmission of the media content to the other electronic device.

At 704, the method of 703 further comprises causing, by the one or more processors in response to the ceasing, a communication device to transmit the media content to the other electronic device. At 705, the method of 701 further comprises extracting, by the one or more processors, the episodic data from an episodic memory window. At 702, the episodic data is obtained from an episodic memory of the electronic device and attached as metadata to the media content.

At 706, the episodic memory window of 705 comprises a single file attached as the metadata to the media content. At 707, the episodic memory window of 705 comprises data captured during a data capture window. At 707, the data capture window spans a time when the media content was captured by at least a predefined pre-capture duration and predefined post-capture duration.

At 708, the episodic memory window of 705 identifies one or more of a time when the media content was captured or a location where the media content was captured. At 709, the episodic memory window of 705 identifies one or more persons situated within an environment of the electronic device when the media content was captured, one or more key words spoken in the environment when the media content was captured, or identification of other electronic devices situated within the environment when the media content was captured.

At 710, an electronic device comprises a user interface receiving user input requesting transmission of media content to another electronic device. At 710, the electronic device comprises one or more processors operable with the user interface. At 710, the one or more processors extract episodic data attached to the media content and present an episodic data summary at the user interface in response to the user input. At 710, the one or more processors preclude transmission of the media content to the other electronic device while presenting the episodic data summary at the user interface.

At 711, the one or more processors of 710 further prompt for additional authorization to transmit the media content to the other electronic device while presenting the episodic data summary at the user interface. At 712, the user interface of 711 further receives the additional authorization to transmit the media content to the other electronic device in response to the one or more processors prompting for the additional authorization.

At 713, the electronic device of 712 further comprises a communication device. At 713, the one or more processors cause the communication device to transmit the media content to the other electronic device in response to the user interface receiving the additional authorization.

At 714, the electronic device of 710 further comprises one or more sensors continually capturing data from an environment of the electronic device. At 714, the electronic device also comprises an episodic memory, operable with the one or more sensors and continually storing, from the data, the episodic data summary in a plurality of episodic memory windows of the episodic memory. At 715, the one or more processors of 714 extract the episodic data summary from an episodic window attached to the media content.

At 716, a method in an electronic device comprises receiving, with a user interface, user input requesting transmission of media content to another electronic device. At 716, the method comprises presenting, with one or more processors, in response to the user input, at least some metadata attached to the media content at the user interface. At 716, the method comprises prompting for additional authorization to transmit the media content to the other electronic device. At 716, the one or more processors preclude transmission of the media content to the other electronic device, while presenting the at least some metadata at the user interface, until the additional authorization is received at the user interface.

At 717, the method of 716 further comprises receiving, at the user interface, the additional authorization to transmit the media content to the other electronic device while precluding the transmission of the media content to the other electronic device. At 717, the method comprises ceasing, by the one or more processors in response to the receiving the additional authorization to transmit the media content to the other electronic device, the precluding the transmission of the media content to the another electronic device and causing, by the one or more processors in response to the ceasing, a communication device to transmit the media content to the another electronic device.

At 718, the one or more processors of 716 present the at least some metadata by presenting a single banner superimposed atop the media content. At 719, the at least some metadata of 716 comprises an episodic memory window attached to the media content when the media content was captured. At 720, the at least some metadata of 716 comprises a summary of events occurring within an environment of the electronic device when the media content was captured.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, at a user interface of the electronic device, user input requesting transmission of media content to another electronic device;
   at least temporarily precluding, by one or more processors of the electronic device, transmission of the media content in response to the user input; and
   presenting, by the one or more processors in response to the user input at the user interface while at least temporarily precluding the transmission of the media content in response to the user input, episodic data detected by one or more sensors of the electronic device during capture of the media content.

2. The method of claim 1, further comprising prompting, by the one or more processors with or in response to the presenting the episodic data at the user interface, for additional authorization to transmit the media content to the another electronic device while at least temporarily precluding the transmission of the media content to the another electronic device.

3. The method of claim 2, further comprising:
   receiving, at the user interface, the additional authorization to transmit the media content to the another electronic device while at least temporarily precluding the transmission of the media content to the another electronic device; and
   ceasing, by the one or more processors in response to the receiving the additional authorization to transmit the media content to the another electronic device, the at least temporarily precluding the transmission of the media content to the another electronic device.

4. The method of claim 3, further comprising causing, by the one or more processors in response to the ceasing, a communication device to transmit the media content to the another electronic device.

5. The method of claim 1, further comprising extracting, by the one or more processors, the episodic data from an episodic memory window, obtained from an episodic memory of the electronic device and attached as metadata to the media content.

6. The method of claim 5, the episodic memory window comprising a single file attached as the metadata to the media content.

7. The method of claim 5, the episodic memory window comprising data captured during a data capture window spanning a time when the media content was captured by at least a predefined pre-capture duration and predefined post-capture duration.

8. The method of claim 5, the episodic memory window identifying one or more of a time when the media content was captured or a location where the media content was captured.

9. The method of claim 5, the episodic memory window identifying one or more persons situated within an environment of the electronic device when the media content was captured, one or more key words spoken in the environment when the media content was captured, or identification of other electronic devices situated within the environment when the media content was captured.

10. An electronic device, comprising:
   a user interface receiving user input requesting transmission of media content to another electronic device; and
   one or more processors operable with the user interface, the one or more processors extracting episodic data attached to the media content and presenting an episodic data summary at the user interface in response to the user input, and precluding transmission of the media content to the another electronic device while presenting the episodic data summary at the user interface.

11. The electronic device of claim 10, the one or more processors further prompting for additional authorization to transmit the media content to the another electronic device while presenting the episodic data summary at the user interface.

12. The electronic device of claim 11, the user interface further receiving the additional authorization to transmit the media content to the another electronic device in response to the one or more processors prompting for the additional authorization.

13. The electronic device of claim 12, further comprising a communication device, the one or more processors causing the communication device to transmit the media content to the another electronic device in response to the user interface receiving the additional authorization.

14. The electronic device of claim 10, further comprising:
   one or more sensors continually capturing data from an environment of the electronic device; and
   an episodic memory, operable with the one or more sensors and continually storing, from the data, the episodic data summary in a plurality of episodic memory windows of the episodic memory.

15. The electronic device of claim 14, the one or more processors extracting the episodic data summary from an episodic window attached to the media content.

16. A method in an electronic device, the method comprising:
   receiving, with a user interface, user input requesting transmission of media content to another electronic device; and
   presenting, with one or more processors, in response to the user input, at least some metadata attached to the media content at the user interface and prompting for additional authorization to transmit the media content to the another electronic device;
   the one or more processors precluding transmission of the media content to the another electronic device, while presenting the at least some metadata at the user interface, until the additional authorization is received at the user interface.

17. The method of claim 16, further comprising:
   receiving, at the user interface, the additional authorization to transmit the media content to the another electronic device while precluding the transmission of the media content to the another electronic device;
   ceasing, by the one or more processors in response to the receiving the additional authorization to transmit the media content to the another electronic device, the precluding the transmission of the media content to the another electronic device; and
   causing, by the one or more processors in response to the ceasing, a communication device to transmit the media content to the another electronic device.

18. The method of claim 16, the one or more processors presenting the at least some metadata by presenting a single banner superimposed atop the media content.

19. The method of claim 16, wherein the at least some metadata comprises an episodic memory window attached to the media content when the media content was captured.

20. The method of claim 16, wherein the at least some metadata comprises a summary of events occurring within an environment of the electronic device when the media content was captured.

* * * * *